UNITED STATES PATENT OFFICE.

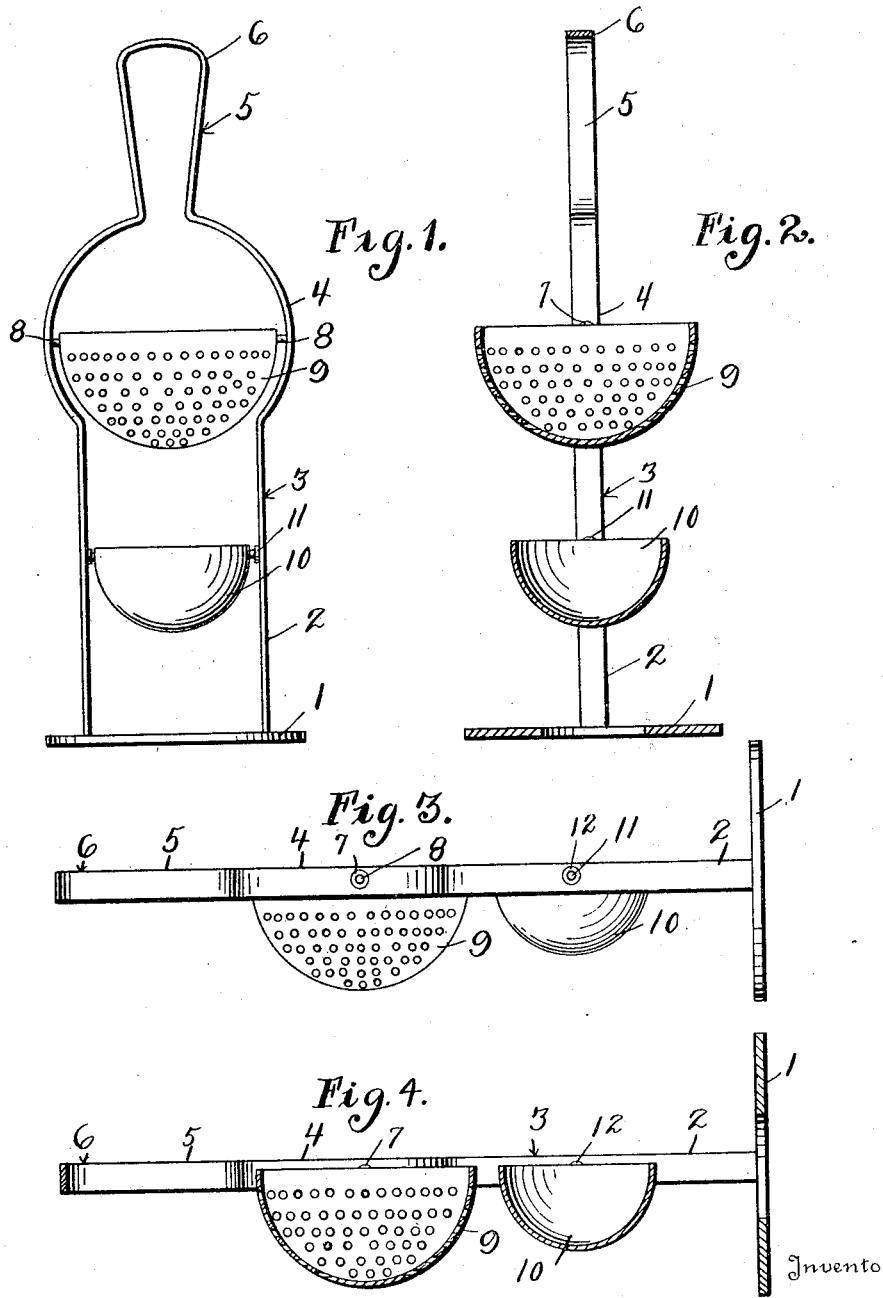

JAMES GUINNEY, OF LARCHMONT, NEW YORK.

TEA OR COFFEE STRAINER.

1,209,149.  Specification of Letters Patent.  Patented Dec. 19, 1916.

Application filed May 25, 1916. Serial No. 99,818.

*To all whom it may concern:*

Be it known that I, JAMES GUINNEY, a citizen of the United States, residing at Larchmont, in the county of Westchester, State of New York, have invented certain new and useful Improvements in Tea or Coffee Strainers; and I do hereby declare the following to be a full, clear, and exact description of the invention, such as will enable others skilled in the art to which it appertains to make and use the same.

The present invention is directed to improvements in tea or coffee strainers, and has for its object to provide a device of this character constructed in such a manner that any drippings from the strainer, after being used will be caught in a pivotally mounted cup which when in its operative position hangs directly under the strainer.

A further object of the invention is to provide a device of this character comprising a frame for pivotally supporting the strainer and drip cup, the same being so arranged that after the strainer has been used and the frame is disposed in a vertical position drippings from the strainer will be collected in the cup.

With these and other objects in view this invention resides in the novel features of construction, formation, and combination of parts to be hereinafter more fully described, claimed and illustrated in the accompanying drawing, in which:—

Figure 1 is a front view of the device when in its inoperative position. Fig. 2 is a vertical central sectional view of the device in its inoperative position. Fig. 3 is a side elevation of the device in its operative position. Fig. 4 is a longitudinal sectional view of the device when in its operative position.

The device consists of a base 1 which is formed from suitable metal and has connected thereto the lower ends of the arms 2 of the frame 3, the upper ends of said arms being curved outwardly, as at 4 and terminate in a yoke 5 which constitutes a handle 6. The curved portions 4 of the arms are provided with diametrically disposed bearings 7 which are engaged by the pins 8 carried by the strainer 9, whereby said strainer is pivotally supported.

The drip cup 10 is provided with pins 11 which are pivotally engaged in the bearings 12 formed in the arms 2, and since the cup 10 will be arranged under the strainer 9 when 3 is in a vertical position it is obvious that the drippings from the strainer will be collected in the cup.

When it is desired to use the device the frame 3 is held in a horizontal position by the handle 6, and at which time the strainer 9 will hang over the cup. After the tea or coffee has been strained the base plate 1 is placed on the table and the strainer 9 and cup 10 will swing into vertical alinement so that drippings from the strainer will be collected in the cup.

The frame 3 is formed from metal and is somewhat resilient, consequently the same can be sprung so that the respective pins of the strainer 9 and cup 10 can be readily engaged or disengaged with the bearings. Thus it will be seen that should the strainer or cup become broken or worn that a new one can be substituted.

What is claimed is:—

A device of the class described comprising a rigid base plate, a frame comprising resilient arms, said arms being engaged with the base plate at their lower ends and having their upper ends each terminating in an arm of a yoke which constitutes a handle, a strainer having pins carried thereby, a cup having pins carried thereby, the pins of said strainer and cup being pivotally and detachably connected to the arms of the frame, said cup being disposed under the strainer when the base plate is engaged with a support and the frame is in a vertical position.

In testimony whereof, I affix my signature, in the presence of two witnesses.

JAMES GUINNEY.

Witnesses:
  JOHN DRURY,
  WILLIAM P. SCOFIELD.

Copies of this patent may be obtained for five cents each, by addressing the "Commissioner of Patents, Washington, D. C."